United States Patent
Gruber et al.

(10) Patent No.: US 9,022,180 B2
(45) Date of Patent: May 5, 2015

(54) ARRANGEMENT OF A BELLOW ON A GUIDE BAR OF A DISC BRAKE

(75) Inventors: Markus Gruber, Ebersberg (DE); Christian Raffin, Grasbrunn (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 533 days.

(21) Appl. No.: 12/900,166

(22) Filed: Oct. 7, 2010

(65) Prior Publication Data

US 2011/0079470 A1  Apr. 7, 2011

Related U.S. Application Data

(63) Continuation of application No. PCT/EP2009/002397, filed on Apr. 2, 2009.

(30) Foreign Application Priority Data

Apr. 11, 2008 (DE) .......................... 10 2008 018 468

(51) Int. Cl.
   *F16D 65/00* (2006.01)
   *F16D 55/2265* (2006.01)
   *F16J 3/04* (2006.01)

(52) U.S. Cl.
   CPC ...... *F16D 55/2265* (2013.01); *F16D 55/22655* (2013.01); *F16J 3/042* (2013.01)

(58) Field of Classification Search
   USPC ......... 188/73.43, 73.44, 73.45, 322.12, 18 A; 277/634, 636, 212 FB
   See application file for complete search history.

(56) References Cited

U.S. PATENT DOCUMENTS

| | | | |
|---|---|---|---|
| 5,183,136 A | * | 2/1993 | Maeda et al. .............. 188/73.44 |
| 2002/0050428 A1 | | 5/2002 | Ishii et al. |
| 2007/0071546 A1 | * | 3/2007 | Ota ................................ 403/50 |

FOREIGN PATENT DOCUMENTS

| | | |
|---|---|---|
| DE | 103 41 095 A1 | 4/2005 |
| GB | 2 296 946 A | 7/1996 |
| WO | WO 02/053931 A1 | 7/2002 |

OTHER PUBLICATIONS

English machine translation of DE 10341095 A1.*
English machine translation of DE 10341095 A1, Apr. 7, 2005.*
German Office Action dated Dec. 9, 2008 including English translation (Six (6) pages).
International Search Report dated Jul. 29, 2009 including English translation (Four (4) pages).

* cited by examiner

*Primary Examiner* — Robert A Siconolfi
*Assistant Examiner* — Vu Q Nguyen
(74) *Attorney, Agent, or Firm* — Crowell & Moring LLP

(57) ABSTRACT

A bellows arrangement on a guide bar of a disc brake, particularly of a commercial vehicle, has an end of the bellows comprising a sealing ring, particularly a quad ring, lying in a circumferential groove of the guide bar. The bellows is pressed into the groove by a retaining ring placed thereon, and is designed so that an air passage can form in the contact area of the sealing ring at the base of the groove, reducing the volume enclosed by the bellows and the guide bar. To this end, the contact shoulder formed on the retaining ring is circumferentially interrupted in segments.

10 Claims, 2 Drawing Sheets

ARRANGEMENT OF A BELLOW ON A GUIDE BAR OF A DISC BRAKE

CROSS-REFERENCE TO RELATED APPLICATIONS

This application is a continuation of PCT International Application No. PCT/EP2009/002397, filed Apr. 2, 2009, which claims priority under 35 U.S.C. §119 from German Patent Application No. DE 10 2008 018 468.3, filed Apr. 11, 2008, the entire disclosures of which are herein expressly incorporated by reference.

BACKGROUND AND SUMMARY OF THE INVENTION

The invention relates to an arrangement of a bellows on a guide bar of a disc brake, in particular of a commercial vehicle, with the bellows lying with an end which has a sealing ring, in particular a quad ring, in an encircling groove of the guide bar and, here, being pressed into the groove by a retaining ring placed thereon.

To protect the guide bars on which, for example, the brake caliper of a sliding caliper disc brake is movably mounted, bellows are provided. The bellows are fastened in each case at the end side to the guide bar and to the component which is movable relative thereto, for example the brake caliper. In this way, dirt is prevented from infiltrating into the sliding region and thereby reducing or eliminating the sliding properties. This likewise applies to moisture, which could otherwise infiltrate and lead to corrosion damage.

The bellows is held on the guide bar in a positively locking fashion, for which purpose the bellows has, at the associated end, a sealing ring, preferably a quad ring, which lies in an encircling groove of the guide bar and is secured in this position by a retaining ring placed thereon.

Here, the retaining ring has a contact shoulder against which the sealing ring is supported radially. The sealing ring is pressed firmly into the groove such that practically airtight contact is generated, but this has considerable disadvantages. Specifically, during a movement of the brake caliper relative to the guide bar, the volume of the region enclosed by the bellows varies. The air however cannot escape, and correspondingly inflates the bellows.

In particular during a changing of a brake pad, during which the brake caliper is displaced along the guide bar in a very short space of time, damage to the bellows can occur primarily when mounting a subsequent, new brake pad. In this case, it is imperative for the bellows to be replaced, because otherwise its protective function is not ensured.

Furthermore, the airtight connection also results in purely functional problems. An inflated bellows acts as an air spring, which presses the brake pad against a brake disc of the disc brake, such that during driving operation, the brake pad bears permanently against the brake disc, which can lead to the brake disc overheating, with the resulting, in particular safety-relevant problems.

The invention further develops an arrangement of the above-type such that the functional or operational reliability of the disc brake is improved overall.

According to the invention, an arrangement of a bellows on a guide bar of a disc brake is provided, in particular of a commercial vehicle. The bellows lies with an end which has a sealing ring, in particular a quad ring, in an encircling groove of the guide bar and, here, is pressed into the groove by a retaining ring placed thereon. In the event of an operationally induced reduction in volume of the space enclosed by the bellows and the guide bar, an air passage is created in the contact region of the sealing ring against the base of the groove.

This novel arrangement of the bellows ensures that, as the latter is compressed, compressed air compensation takes place, since the resulting excess air quantity, so to speak, can escape without problems.

In particular during the fast compression of the bellows described with regard to the prior art, such as is typical during an exchange of the brake pads, immediate pressure compensation now takes place between the interior space enclosed by the bellows and the environment.

Here, the air passage functions as a non-return valve, with the sealing ring lying fully in the groove again after a pressure compensation has taken place.

According to one advantageous embodiment of the invention, it is provided that the contact shoulder, which bears against the sealing ring, of the retaining ring is partially cut out, such that the contact shoulder does not form any support for the sealing ring in said regions.

In this way, in the event of an excess pressure being generated in the interior space of the bellows, the sealing ring can lift up from the base of the groove of the guide bar, specifically to such an extent and for such a length of time as to enable the pressure compensation to take place.

The limit pressure for the pressure dissipation may be determined by the geometry of the cutouts on the contact shoulder. The larger the cutouts, the lower the excess pressure that can form in the interior space of the bellows.

The described lining grinding is now prevented as effectively as the inflation of the bellows during a brake pad exchange, as a result of which the risk of damage to the bellows is practically eliminated. Furthermore, since the bellows is only compressed and not stretched during operation, that is to say only the generation of an elevated internal pressure must be prevented by the invention, measures that would make pressure compensation necessary in the event of stretching of the bellows need not be provided, such that the invention can be realized with extremely simple means.

This is likewise associated with production and assembly expenditure which is kept very low and therefore extremely cost-effective, such that the invention can fundamentally be realized in a cost-neutral fashion.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
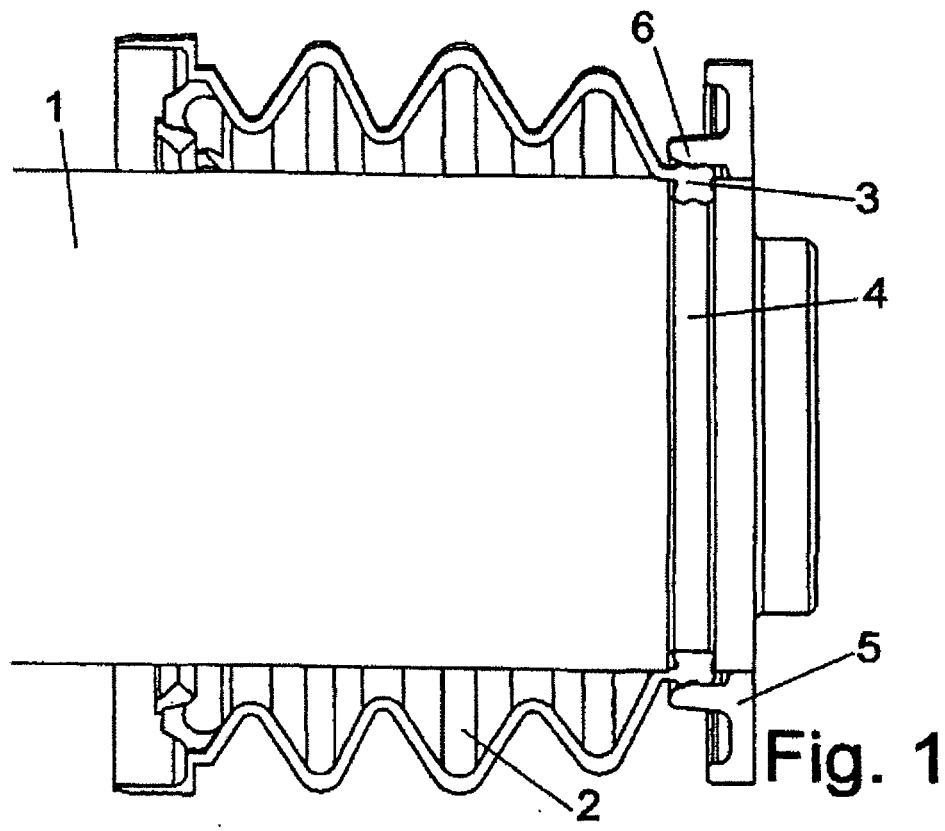
FIG. 1 shows an arrangement according to an embodiment of the invention in a functional position in a longitudinal section view.
Figure 2:
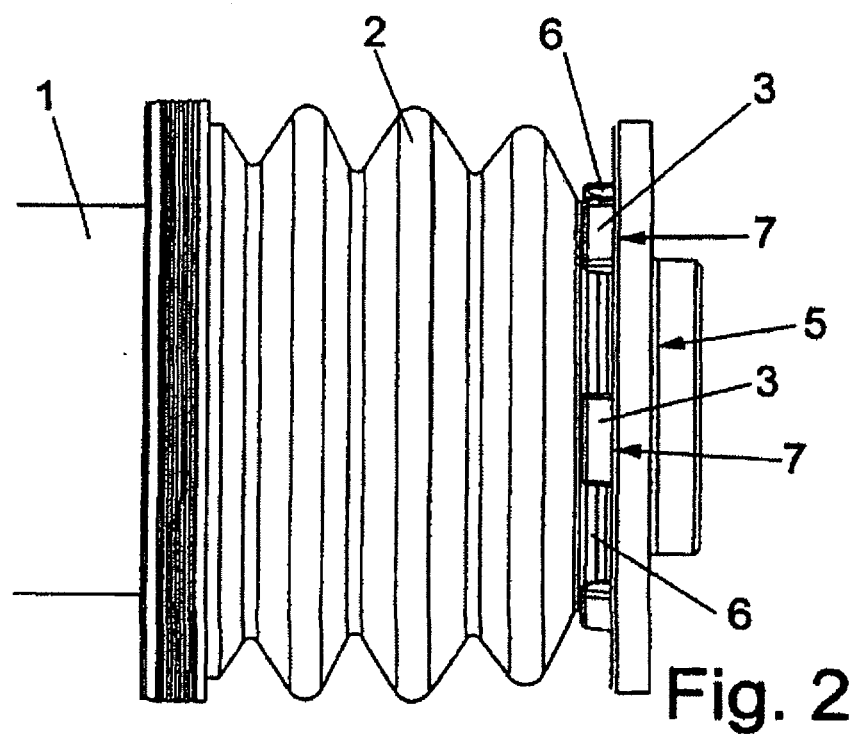
FIG. 2 shows the arrangement according to FIG. 1 in a plan view.

The figures illustrate an arrangement of a bellows 2 on a guide bar 1 of a disc brake, in particular of a commercial vehicle, with the bellows 2 lying, with an end which has a sealing ring 3, in an encircling groove 4 of the guide bar 1. Here, the sealing ring 3 is designed as a quad ring which can be expanded in the radial direction more easily than an O-ring.

The sealing ring 3 is pressed into the groove 4 by way of a retaining ring 5, with the retaining ring 5 having, running around it in sections, contact shoulders 6. The contact shoulders 6 bear against the sealing ring 3 and press the latter against the base of the groove 4.

In the contact region of the sealing ring 3 against the base of the groove 4, in the event of an operationally induced reduction in volume of the space enclosed by the bellows 2 and the guide bar 1, an air passage is created which, in the example, is realized in that the contact shoulders 6 are arranged spaced apart from one another and between them form in each case one recess 7, which recesses enable the sealing ring 3 to expand radially.

Figure 3:
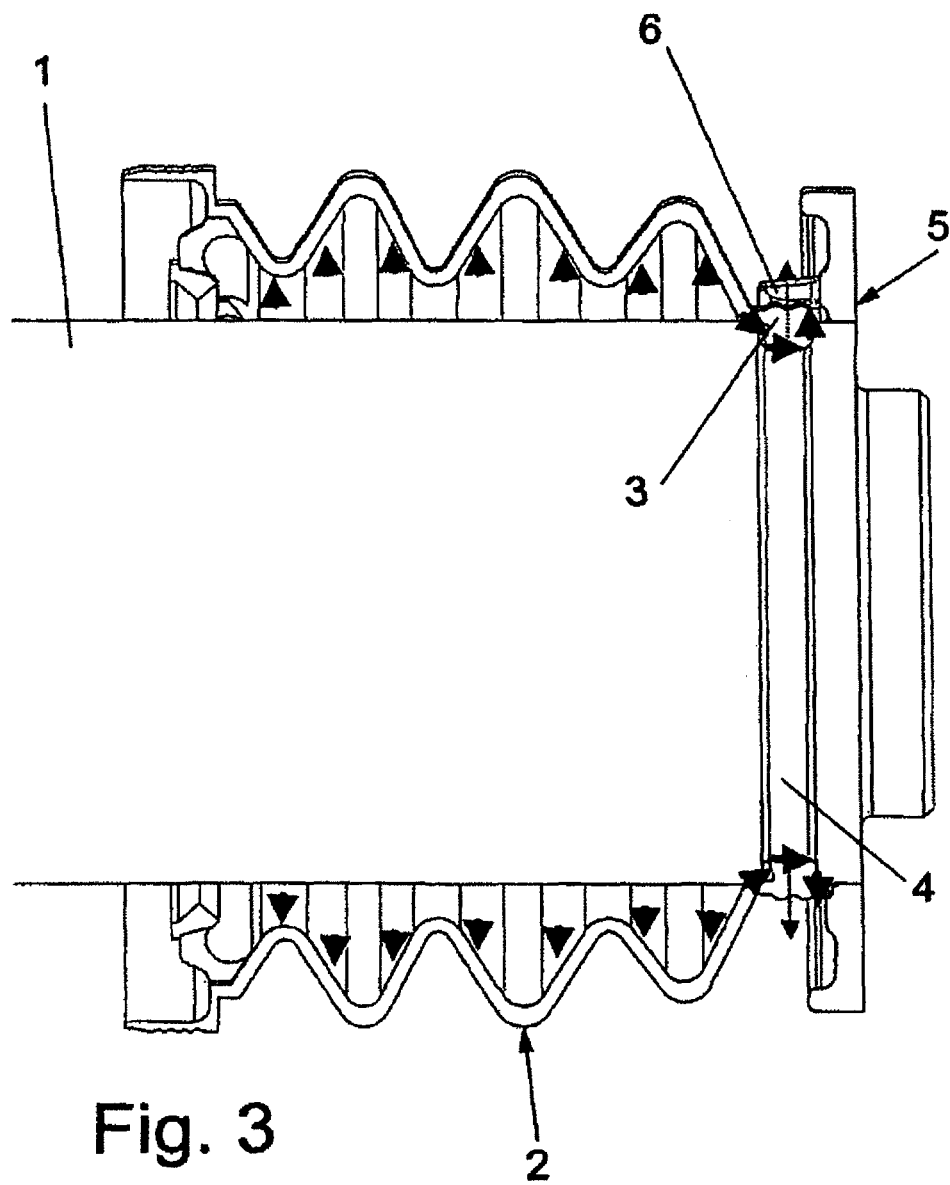
FIG. 3 shows the arrangement in a further functional position, likewise in a longitudinal section view.

This operation is shown in FIG. 3 by means of illustrated arrows, with the arrows directed radially at the inner wall of the bellows 2 representing the internal pressure, and with the arrow positioned at the contact shoulder 6 representing the expansion direction of the sealing ring 3, while the flow profile between the expanded sealing ring 3 and the groove 4 is illustrated symbolically by the arrows depicted in said region.

Here, the cutouts 7 distributed uniformly over the circumference are of equal length in terms of their circumferential extent, and correspond in terms of their width at least to the width of the sealing ring 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for a disc brake, the arrangement comprising:
   a guide bar of the disc brake, the guide bar having an encircling groove;
   a bellows arranged on the guide bar, the bellows having an end with a sealing ring, the sealing ring being configured to seal against air flow between the sealing ring and the guide bar in the absence of a higher pressure in a volume of space enclosed by the bellows than in a region outside the bellows;
   a retaining ring operatively arranged to press the sealing ring of the bellows radially into the encircling groove of the guide bar;
   wherein the sealing ring, groove and retaining ring are operatively configured such that an inner circumference of the sealing ring seals against an entire radially inner base of the encircling groove when the sealing ring is in a rest position, and in an event of an operationally induced reduction in volume of the space enclosed by the bellows and the guide bar, an air passage is formed in at least a portion of a contact region of the inner circumference of the sealing ring against the radially inner base of the encircling groove.

2. The arrangement according to claim 1, wherein the sealing ring is a quad ring.

3. The arrangement according to claim 2, wherein the arrangement is for a commercial vehicle disc brake.

4. The arrangement according to claim 1, wherein the retaining ring comprises contact shoulders arranged spaced apart from one another, said contact shoulders being supported on an outside surface of the sealing ring; and
   wherein, in each case, two contact shoulders delimit a cutout exposing the sealing ring in the contact region.

5. The arrangement according to claim 4, wherein at least one cutout is provided.

6. The arrangement according to claim 4, wherein a plurality of cutouts are distributed uniformly over a circumference of the retaining ring.

7. The arrangement according to claim 4, wherein a plurality of cutouts of equal circumferential length are provided over a circumference of the retaining ring.

8. The arrangement according to claim 5, wherein the at least one cutout corresponds, in terms of width, at least to a width of the sealing ring.

9. The arrangement according to claim 6, wherein the cutouts correspond, in terms of width, at least to a width of the sealing ring.

10. The arrangement according to claim 7, wherein the cutouts correspond, in terms of width, at least to a width of the sealing ring.

\* \* \* \* \*